United States Patent [19]

Budecker

[11] Patent Number: 4,850,825
[45] Date of Patent: Jul. 25, 1989

[54] RADIAL PISTON PUMP

[75] Inventor: Ludwig Budecker, Frankfurt am Main, Fed. Rep. of Germany

[73] Assignee: Alfred Teves GmbH, Frankfurt am Main, Fed. Rep. of Germany

[21] Appl. No.: 146,055

[22] Filed: Jan. 20, 1988

[30] Foreign Application Priority Data

Jan. 23, 1987 [DE] Fed. Rep. of Germany ....... 3701857

[51] Int. Cl.⁴ .................. F04B 21/00; F04B 39/00; F04B 1/04
[52] U.S. Cl. ................................ 417/538; 417/273; 417/271
[58] Field of Search .............. 417/271, 273, 538; 92/72; 91/493, 496

[56] References Cited

U.S. PATENT DOCUMENTS

| | | | |
|---|---|---|---|
| 1,463,109 | 7/1923 | Witman | 417/534 X |
| 1,526,343 | 2/1925 | Jouanneaux | 417/538 |
| 1,896,448 | 2/1933 | Kercher | 417/271 X |
| 2,271,570 | 2/1942 | Pardee | 417/273 |
| 3,431,865 | 3/1969 | Cook et al. | 417/273 |
| 3,514,224 | 5/1970 | Budecker | 417/273 |

FOREIGN PATENT DOCUMENTS

| | | | |
|---|---|---|---|
| 1453663 | 3/1969 | Fed. Rep. of Germany | 417/273 |
| 1294813 | 5/1969 | Fed. Rep. of Germany | 417/273 |
| 2243137 | 3/1974 | Fed. Rep. of Germany | 417/273 |
| 3040445 | 5/1982 | Fed. Rep. of Germany | 417/273 |
| 3517810 | 5/1986 | Fed. Rep. of Germany | 417/462 |
| 592279 | 4/1925 | France | 91/496 |

Primary Examiner—William L. Freeh
Attorney, Agent, or Firm—James B. Raden

[57] ABSTRACT

A radial piston pump with at least one pair of pistons which alternately perform working strokes and are arranged in a stationary cylinder block with working chambers comprising inlet valves and outlet valves. An eccentric shaft controls the radial movement of the pistons and an annular device connects the radially outward end portions of the pistons. To avoid friction between eccentric and pistons, provisions are made that the eccentric shaft is supported outside of the cylinder block. The radially outward end portions of the pistons project radially outwardly from the cylinders and, by way of the annular device, take support on the eccentric of the eccendtric shaft. The eccentric is rotatably supported in the annular device.

6 Claims, 3 Drawing Sheets

RADIAL PISTON PUMP

BACKGROUND OF THE INVENTION

The present invention relates to a radial piston pump for a hydraulic anti-lock brake system. At least one pair of pistons are provided which alternately perform working strokes and are arranged in a stationary cylinder block with working chambers comprising inlet valves and outlet valves. An eccentric shaft controls the radial movement of the pistons and an annular device interconnects the end portions of the pistons.

In a known radial piston pump of this type (German published patent specification No. 16 53 637 which corresponds to U.S. Pat. No. 3,514,224), the eccentric shaft is slidably supported in an axial bore of the cylinder block. This necessitates that the surface of the cylinder block bore and of the eccentric shaft are precisely machined. Nevertheless, these surfaces are subjected to considerable wear. The pistons with their radially inner ends slide on eccentric bushing encompassing the eccentric. The consequence of this is wear due to friction on the pistons and the eccentric bushings.

The annular device connecting the end portions of the pistons consists of a one-part coupling ring which engages with axial extensions into annular grooves of the radially outer end portions of the pistons and which ensures that the pistons are forced to return from the upper to the lower dead center. Hence, unlike in other known radial piston machines, this return is not dependent on the centrifugal force, and delivery is possible until the lowest number of revolutions. Thus, the coupling ring merely causes resetting. However, it is placed in an axially open annular groove of the cylinder block and is axially secured in position therein by an axial cylindrical projection of the pump housing. Hence, its diameter is comparatively large, and it is in abutment on the cylinder block and the pump housing on both sides thereof, it is exposed to large-surface frictional stress.

SUMMARY OF THE INVENTION

It is the object of the present invention to provide a radial piston pump of the type described in which less wear is occasioned.

This object is achieved according to the instant invention in that the end portions at one end of the pistons project radially from the cylinders and are supported by way of the annular device on the eccentric of the eccentric shaft. The eccentric is rotatably supported without contact in the annular device between the eccentric shaft and the cylinder block. In this arrangement, there is no friction between cylinder block and eccentric shaft. The drive of the pistons takes place in both radial directions through the annular device taking support on the eccentric so that sliding contact between the eccentric bushings mounted thereon and the pistons are eliminated for a full turn of the eccentric shaft. Further, the wear connected therewith is eliminated.

In one embodiment the eccentric shaft is placed outside of the cylinder block and the radially outer end portions of the pistons project radially outwardly from the cylinders. Preferably, the eccentric shaft is the shaft of the drive motor of the pump. In this arrangement, there is no need for an additional bearing for the eccentric shaft and a clutch between motor shaft and eccentric shaft. The annular device may comprise a ring which connects the pistons with play in circumferential direction and supports them on the eccentric. This ring transmits the eccentric movement onto the pistons and in this way simultaneously acts as a coupling member between the eccentric shaft and the pistons. The circumferential play permits a slight relative movement in circumferential direction between the connecting and supporting ring corresponding to the eccentricity of the eccentric. The friction occurring between the ring and piston is negligible compared with the amount of friction arising over the entire periphery of the eccentric or the eccentric bushings and the pistons.

To provide the circumferential play, the connecting and supporting ring can engage with clearance into cut-out portions in the end portions of the pistons. To this end, the connecting and supporting ring may contain axial slots which engage into annular grooves forming the cut-out portions.

According to another embodiment, the annular device may comprise a supporting ring which abuts on ends of the pistons projecting from the cylinders and which is supported on the eccentric, as well as of a ring interconnecting the projecting end portions of the pistons. The connecting ring of the pistons provides that the pistons are urged radially against the supporting ring, without any relative movement taking place between the pistons and the connecting ring and without friction ensuing therefrom. The relative movement taking place between the supporting ring and the pistons as a result of the eccentric movement of the first-mentioned entails only comparatively little friction. Nevertheless, this may be still further reduced in that the projecting piston ends are rounded and bear against matingly rounded circumferential grooves on the inner side of the supporting ring. The abutment of the supporting ring on round piston ends simultaneously avoids a jammed condition between supporting ring and pistons. Further, the connecting ring can simply engage into cut outs in the end portions of the pistons. These cut outs may also take the form of annular grooves in the end portions of the pistons.

In known devices, the inlet valves are designed as lateral slots in the cylinder wall, which slots are opened or closed by the pistons depending on the stroke movement they perform, and only the outlet valves are designed as non-return valves. However, it has been found that both the inlet valves and the outlet valves can be designed as non-return valves. These are subject to practically no wear caused by friction. Preferably, the outlet valve is a simple change-over valve. In this event, one single valve closure member is sufficient. Further, the eccentric can be supported in a roller bearing accommodated in the annular device. A roller bearing provides particularly reduced friction and wear.

Further, provisions can be made that the eccentric shaft projects with an end portion comprising the eccentric into a sealed hollow space of a pump housing receiving the cylinder block and that an inlet channel for the fluid to be pumped terminates into this hollow space. In this arrangement, the fluid to be pumped, if the fluid is oil, effects simultaneous lubrication of the bearing between eccentric and annular device. It is advantageous if the side of the cylinder block facing the eccentric is provided with inlet openings and if, intermediate the free eccentric end and the inlet openings, a hood shielding the inlet openings at a distance therefrom is secured at the cylinder block within the annular device. This shielding hood provides that the fluid turbulences caused by the eccentric will not inhibit the fluid when entering into the inlet openings.

A simple embodiment provides that the pump housing is designed intergrally with the drive motor housing and is closed by the cylinder block. Accordingly, no separate housing is needed for the pump. Furthermore, an arrangement can be provided in which the eccentic extends axially into an axial cylinder block bore spaced radially therefrom and the radially inner end portions of the pistons extend radially into said bore, and the annular device is likewise spaced radially from the inner side of the cylinder block bore. This results in an axially short construction of the pump, wherein the annular device which is also disposed in the cylinder block bore is of a smaller diameter, whereby a correspondingly smaller relative movement and a smaller frictional surface between the piston ends and the supporting ring is brought about. If, in addition, there is arranged axial securing-in-position of the annular device on the eccentric and in the cylinder block bore, because of the small diameter of the annular device there results only a minor frictional surface of the axial end faces of the annular device. In addition thereto, the drive motor housing can project with a cylindrical projection to fit into the cylinder block bore, with the projection being coaxial relative to the eccentric shaft. This has as a consequence a corresponding radially compact structure.

BRIEF DESCRIPTION OF THE DRAWINGS

The instant invention and the improvements provided thereby will be described in more detail hereinbelow by way of preferred embodiments with reference to the accompanying drawing wherein.

Figure 4:
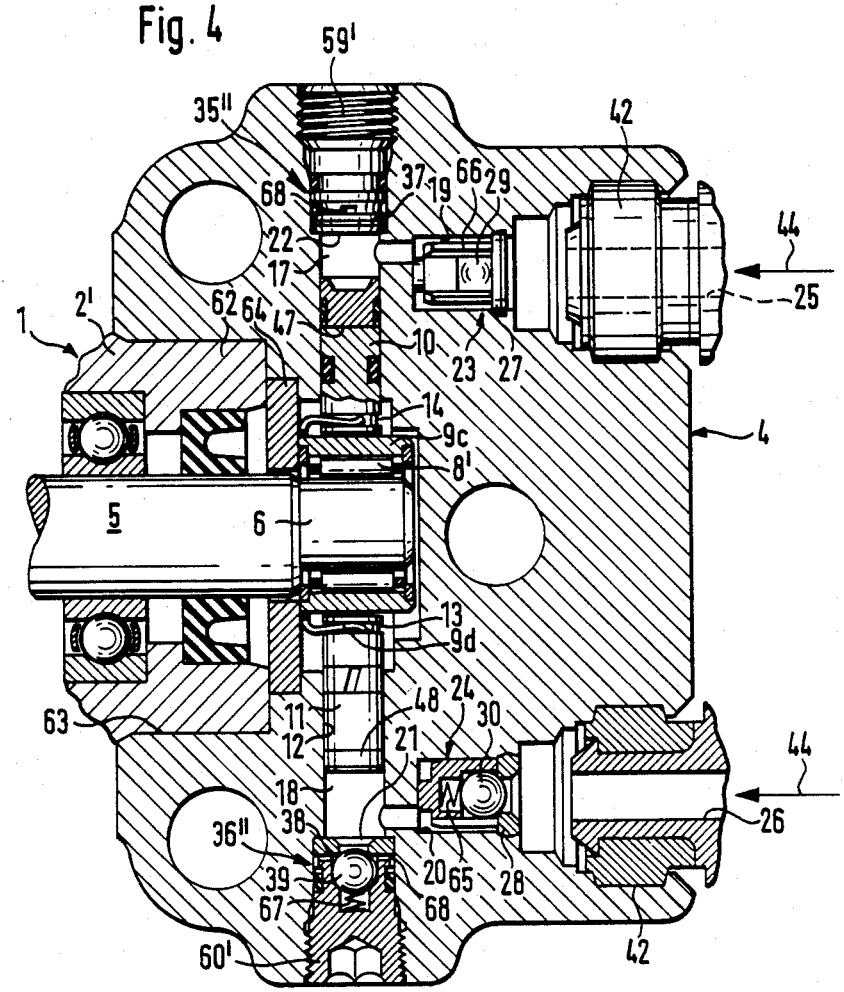

and, FIG. 4 is a section of a partial axial cross section of a third embodiment of the radial piston pump.

DETAILED DESCRIPTION OF A PREFERRED EMBODIMENT

Figure 1:
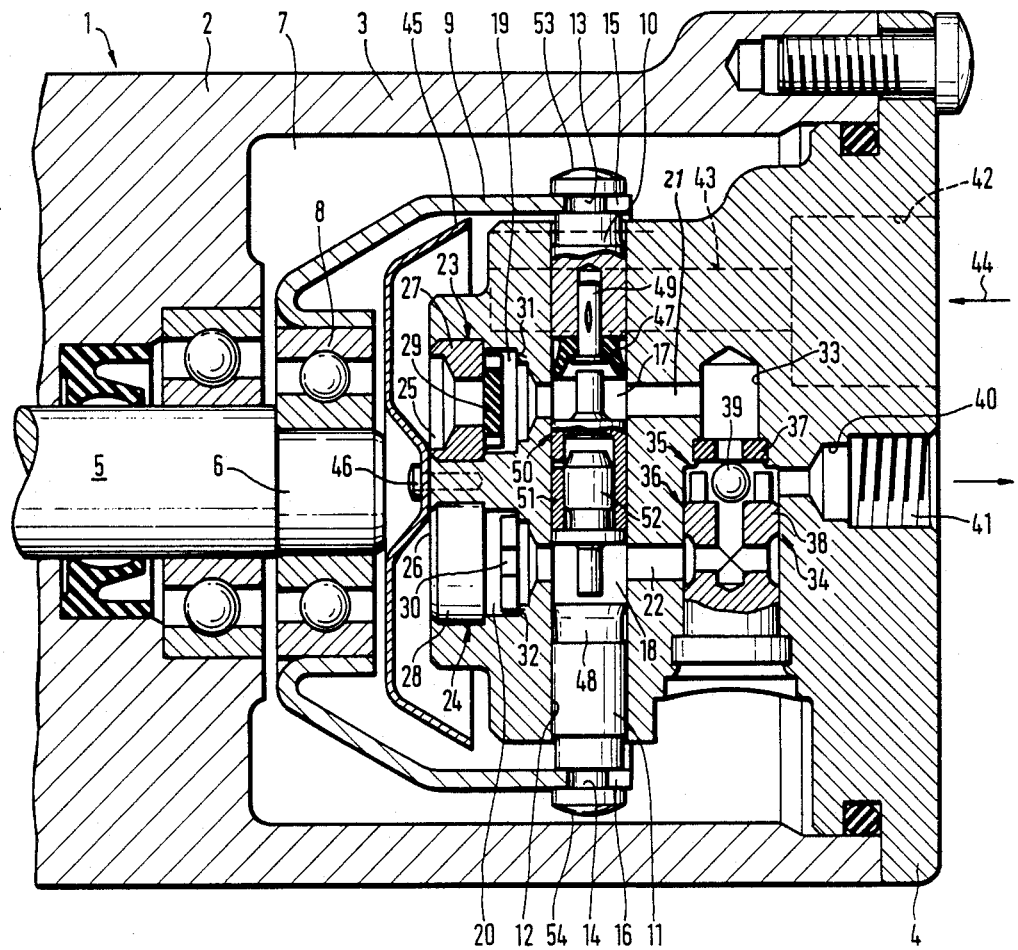
FIG. 1 is a section of a partial axial cross section of a first embodiment of the radial piston pump in accordance with the present invention.

In the radial piston pump disclosed in FIG. 1, a partially illustrated electric drive motor 1 is accommodated in a housing 2 with an axially protruding connecting flange 3 which, at the same time, forms the pump housing which is sealedly closed by a cylinder block 4. The shaft 5 of the motor is simultaneously designed as an eccentric shaft with an eccentric 6 at the free end portion extending into a hollow space 7 of the pump housing 3. By way of a roller bearing 8 furnished with balls, the eccentric 6 is rotatably supported in one end of a cylindrical annular device constituting a connecting and supporting ring 9. The connecting and supporting ring 9 is in engagement with two pistons 10 and 11 which are axially slidably accommodated in a radial through-bore 12 in the cylinder block 4 and which project with their radially outer end portions beyond the periphery of the cylinder block 4.

Figure 2:
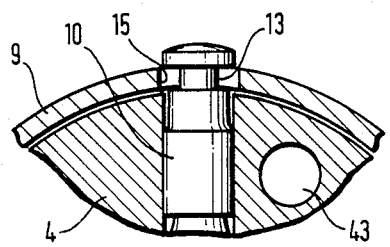
FIG. 2 is a section of a radial cross section through the radial piston pump according to FIG. 1.

The radially outer end portions of the pistons 10, 11 are each furnished with an annular groove 13 and 14 into which the connecting and supporting ring 9 engages an axial slot 15 and 16, respectively, so that it interconnects the pistons 10 and 11 and simultaneously supports them through the roller bearing 8 on the eccentric 6. As is shown in FIG. 2, the slots 15, 16 leave a clearance in the circumferential direction between themselves and the annular groove 13 or 14, the amount of clearance corresponding to the eccentricity of the eccentric 6.

The bore 12 forms cylinders 17, 18 for the pistons 10, 11. These cylinders 17, 18 confine working chambers of the pump together with a part of axial stepped inlet bores 19, 20 and with axial outlet bores 21, 22 which connect each to the cylinders 17 and 18. One inlet valve 23, 24 is arranged in each of the inlet bores 19, 20 intermediate inlet openings 25, 26 of the inlet bores 19, 20 which face the eccentric 6 and the cylinders 17, 18. The inlet valves 23, 24 are designed as non-return valves. Each non-return valve comprises one valve seat member 27, 28 and one valve closure member 29, 30 having the shape of a plate with axially through cut outs at the periphery, which cuts out release the flow passage to the cylinders 17, 18 in the event of the plates abutting on shoulders 31, 32 of the inlet bores 19, 20.

The outlet bores 21 and 22 are interconnected by a radial stepped bore 33 accommodating a change-over valve 34 which comprises two outlet valves 35, 36 which each include one valve seat member 37, 38 as well as one spherical valve closure member 39 common to both valve seat members 37, 38. The valve closure member alternately releases the flow passage though the outlet bores 21 and 22 to one joint outlet bore 40 which is provided with an outlet port 41. By way of an inlet port 42 and a succeeding inlet bore 43, the fluid 44 to be delivered can flow into the interior of the connecting and supporting ring 9 which is in communication with the hollow space 7 by way of the intermediate space between the connecting/supporting ring 9 and the periphery of the cylinder block 4.

In the intermediate space between eccentric 6 and bearing 8, on the one hand, and the end face of the cylinder block 4 including the inlet openings 25, 26, on the other hand, a hood 45 is secured to the cylinder block 4, for example, by means of a screw 46. The hood is spaced from the inlet openings 25, 26, the eccentric 6, the roller bearing 8 and the ring 9 and shielding the inlet openings relative to the turbulences in the interior of the ring 9 which are caused by rotation of the eccentric 6. The radially inner ends of the pistons 10, 11 are furnished with a cup-type sleeve seal 47 and 48, respectively, which respectively are fastened to the radially inner frontal ends of the pistons 10, 11 by means of a setbolt 49 which is inserted in snug fit into an axial bore of the respective piston 10, 11.

Furthermore, a blocking device 50 isolating the working chambers one to the other is fastened in the bore 12 between the pistons 10 and 11. Blocking device 50 is composed of a generally bowl-shaped element 51 which prior to the insertion of the pistons 10, 11 can be inserted with play into the bore 12 until it assumes the position illustrated and which will then be expanded by inserting an oversized bolt 52 into the bore of the bowl-shaped element 51 and will be locked in the bore 12.

During operation, the eccentric shaft 5 causes the eccentric 6 and thus the connecting and supporting ring 9 to revolve so that the connecting and supporting ring 9 entrains the one piston outwardly and the other piston inwardly during one half of a rotation, while it entrains the first piston inwardly and the second piston outwardly during the other half of a rotation. If, for instance, one piston 10 performs a working stroke or compression stroke, (as shown), the other piston 11 will perform a suction stroke, without any slide surface revolving at the pistons 10, 11. Instead, there is solely a slight relative movement in circumferential direction due to the eccentric play between the pistons 10 and 11 and the slots 14, 15 receiving them, with the friction being negligible. The eccentric 6 does not slide in the cylinder block 4 either. Therefore, there is no need for correspondingly machining the eccentric surface and a cylinder block bore. During a working stroke of the piston 10, the inlet valve 23 is closed and the outlet valve 35 is open, while the inlet valve 28 is open (because of the simultaneously occurring suction stroke of the piston 11) and the outlet valve 36 is closed. During a suction stroke of the piston 10 and a working stroke of the piston 11, however, the valve positions are in reverse order relative to the illustrated positions.

Figure 3:
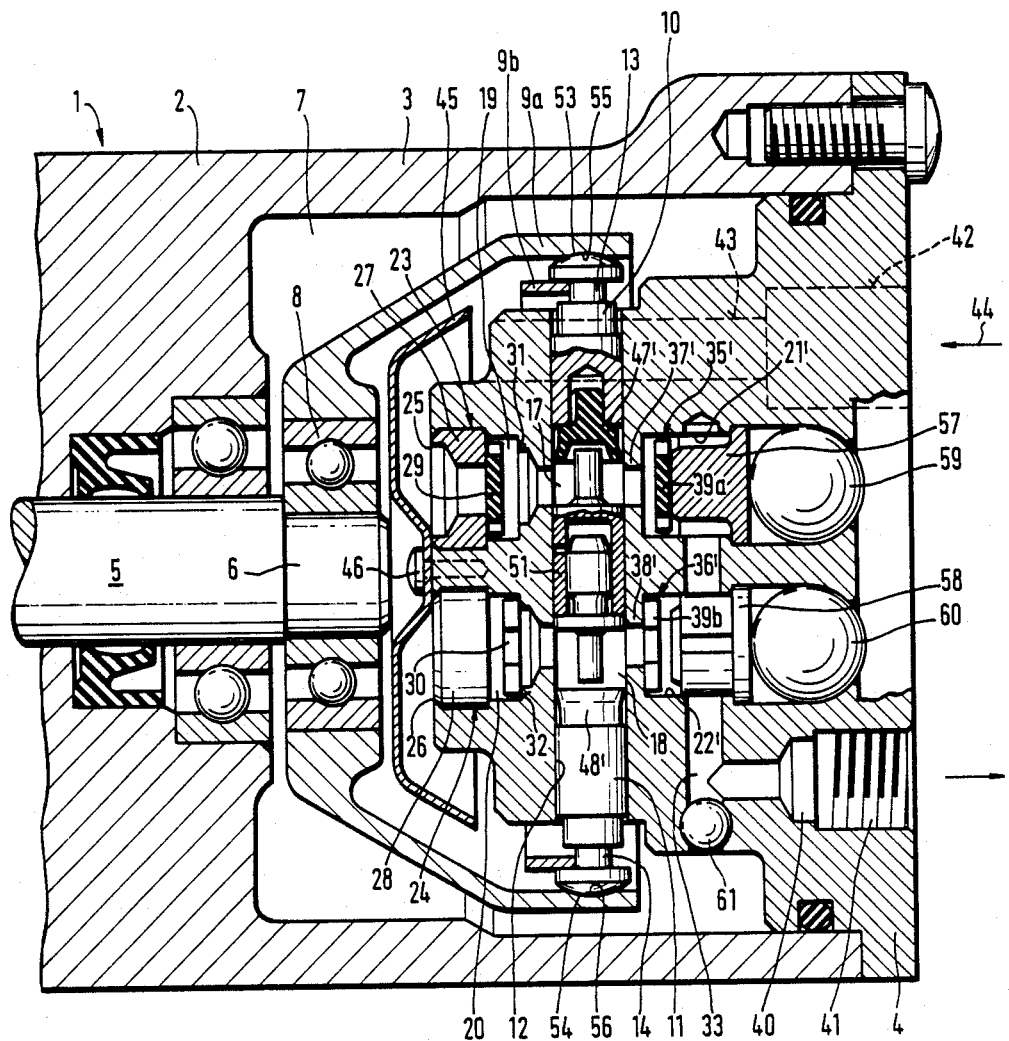
FIG. 3 is a section of a partial axial cross section of a second embodiment of the radial piston pump in accordance with the present invention.

The embodiment according to FIG. 3 differs from the embodiments according to FIGS. 1 and 2 substantially only in the design of the annular device 9a, 9b, of the outlet valves 35′, 36′ and the cup-type sleeve seals 47′, 48′. Thus, the annular device in this embodiment includes a supporting ring 9a which is abutting on the radially outer rounded ends 53, 54 of the pistons 10, 11 and supported on the eccentric 6 as well as of a ring 9b interconnecting the radially outer end portions of the pistons 10, 11. The rounded piston ends 53, 54 abut in matingly rounded circumferential grooves 55, 56 on the inner side of the supporting ring 9a. The connecting ring 9b solely engages with radial preload into the annular grooves 13, 14. In this arrangement, there is no need for the axial slots 15, 16, and a possible canting between the supporting ring 9a and the pistons 10, 11 during operation is avoided. Furthermore, the friction between the piston ends 53, 54 and the inner side of the supporting ring 9a is less. During operation, the supporting ring 9a moves toward and away in relation to the pistons 10, 11 in circumferential direction corresponding to the eccentricity of the eccentric 6, so that there is merely line contact between the supporting ring 9a and the pistons 10, 11. On the other hand, no relative movement takes place between the connecting ring 9b and the pistons 10, 11.

The valves 35′ and 36′ are each designed separately in a stepped outlet bore 21′ and 22′, respectively, their valve seat being shaped by shoulders 37′ and 38′ of the outlet bores 21′, 22′, and the valve closure members 39a, 39b being designed like the valve closure members 29, 30. The axially through-extending outlet bores 21′, 22′ are each closed by a bore-closure member 57, 58 acting simultaneously as a stop for the valve closure members 39a, 39b. The bore-closure members are provided with axial grooves at their periphery for the passage of the fluid to be delivered into the outlet collecting bore 33 and are each fixed in position in the respective outlet bore 21′, 22′ by means of a closing ball 59, 60. The bore 33 is also sealingly closed radially to the outside by a closing ball 61. By way of axial extensions, the cup-type sleeve seals 47′, 48 are secured in a press fit in the axial bores of the pistons 10, 11.

The mode of operation of the radial piston pump according to FIG. 3 is principally the same as that of the radial piston pump according to FIG. 1. During a compression, that is, working stroke of the piston 10, simultaneously, a suction stroke of the piston 11 is performed, with the valves 23 and 36′ being closed and the valves 24, 25′ being open. On each rotation of the eccentric 6, the supporting ring 9a contains the pistons 10, 11 from displacing radially inwardly, while at the same time the connecting ring 9b provides that the piston that is then not acted upon by the supporting ring 9a to be pressed radially outwardly against the inner side of the supporting ring 9a.

In the embodiment according to FIG. 4, the drive motor 1 projects with a cylindrical projection 62 of its housing 2′, which is coaxial relative to its shaft, 5, to fit into an axial stepped bore 63 of the cylinder block 4. Similarly, the radially inward end portions of the pistons 10, 11 extend into the bore 63 and bear with their radially inner ends against the outside of a supporting ring 9c which is likewise accommodated in the bore 63, yet spaced radially from the inner side of bore 63, on the eccentric 6 by means of a roller bearing 8′ designed as a needle bearing. Likewise the eccentric 6 and eccentric shaft 5 are at a radial distance relative to the inner side of the bore 63. Projecting into the annular grooves 13, 14 of the radially inward end portions of the pistons 10, 11 is a connecting ring 9b by means of axial undulated extensions which, due to their undulation, are placed in the annular grooves 13, 14 in a radially resiliently biased fashion. The connecting ring 9d likewise bears against the outside of the supporting ring 9c; however, it may also be spaced radially therefrom. Further, the eccentric shaft 5 is encompassed by an annular locking washer 64 which abuts on the frontal end of the projection 62 and a shoulder or step of bore 63 and ensures an axial securing-in-position of the supporting ring 9c and the connecting ring 9d.

The inlet valves 23, 24 of the embodiment according to FIG. 4 which are also provided as non-return valve differs from the inlet valves 23, 24 of the embodiments according to FIGS. 1 to 3 only in that their closure members 29, 30 are shaped like balls and take support on springs 65 in their valve housing 66 which communicates by way of axial slots in its lateral wall with the inlet bore 19 and 20, respectively.

The outlet valves 35″ and 36″ are also provided as non-return valves, but they are incorporated in the radial through-bore 12 in the cylinder block 4. Their respective valve closure member 39 is likewise urged by the force of each spring 67 against the valve seat 37 or 38, respectively. Simultaneously, the valve housings 59′ and 60′ of the outlet valves 35″, 36″ form closure members for the bore 12 and by way of radial channels 68 shaped in their lateral wall, are in communication with an outlet bore (not shown) which terminates vertically relative to the plane of the drawings into the annular chamber between valve housing 59′ or 60′ and the bore 12. In turn, these outlet bores are connected with one joint outlet bore (not shown). Allocated to each one of the inlet valves 23, 24 is an inlet port 42 of its own, the inlet ports 42 being supplied with the fluid 44 to be conveyed out of a common (non-illustrated) inlet line and a common reservoir.

The mode of operation of the embodiment according to FIG. 4 is principally the same as that of the embodiment according to FIG. 1, the difference being that the embodiment according to FIG. 1 has an axially and radially more compact design and the annular device 9c, 9d is not moved in the fluid 44 to be delivered because the fluid 44 to be conveyed is supplied to the cylinders 17, 18 directly. Furthermore, the annular device is of smaller diameter so that the annular device does not only need less material but is at the same time less subject by wear due to friction, since it slides with a correspondingly smaller annular surface on the annular locking washer 64 or on the bottom of bore 63. Because of the radial distance between the inner side of bore 63 and the eccentric shaft 5, there does not occur friction between this inner side and the eccentric shaft either.

The illustrated embodiments can be varied from the configurations described. For example, in lieu of the axial slots 13, 14, oblong holes extending in circumferential direction can be provided in the connecting and supporting ring 9, with the radially outer, mushroom-shaped end portions of the pistons 10, 11 being provided separately of the remaining part of the pistons and being connectible therewith in a detachable manner, such as by screws. The circumferential edge of the hood 45 can be sealingly connected with the circumferential edge of the cylinder block 4, whereby a closed inlet collecting chamber for the fluid 44 to be conveyed results, into which the inlet bore 43 terminates. Turbulences are thereby avoided altogether in the inlet collecting chamber. Instead of using the roughly Maltese-cross-shaped plates as valve closure members, spherical valve closure members also can be provided when the inlet bores are of corresponding shape.

What is claimed is:

1. In a radial piston pump including a stationary cylinder block, at least one pair of pistons slidably received within said block for reciprocatory movement in working strokes in working chambers within said block along a path extending radially of a central axis, each of said working chambers having inlet and outlet valve means operatively associated therewith, and means for driving said pistons in working strokes wherein each piston of the pair of pistons moves in a radial direction opposite to that of the other of the pair of pistons;

the improvement wherein said drive means comprises a drive shaft rotatable about said central axis, an eccentric portion on said drive shaft having an eccentric axis parallel to and offset from said central axis, annular ring means mounted on said eccentric portion, each of said pistons having a radially outer end portion projecting from said block and means defining a groove-like recess in said outer end portion having at least one surface lying in a general plane normal to the radial path of movement of the piston, said ring means including coupling means engageable within the recesses in both of said pistons for supporting said pistons upon said ring member and for driving said pistons in said reciprocatory working strokes upon rotation of said drive shaft while accommodating a limited degree of movement of said ring means relative to said pistons circumferentially of said eccentric axis.

2. The invention defined in claim 1 wherein said eccentric portion is located at the exterior of said block, said ring means being supported at one axial end upon said eccentric portion and projecting axially from said one end into axially overlapping relationship with said block in radially outwardly spaced relationship from the exterior of said block, said coupling means being located adjacent the opposite axial end of said ring means.

3. The invention defined in claim 2 wherein said member includes a radially inwardly facing surface adjacent said opposite axial end slidably engaging the outer end of each piston, and said coupling means includes spring means engaged in said recesses in said pistons resiliently biasing said pistons radially outwardly into engagement with said surface.

4. The invention defined in claim 2 wherein said pump further comprises a housing having a fluid containing chamber therein, said block and said ring member being located within said chamber and said block having a fluid inlet opening adjacent said eccentric, and a hood mounted on said block within said ring means to shield said inlet opening from said eccentric portion.

5. The invention defined in claim 2 wherein said ring means comprises a rigid annular member rotatably mounted at one axial end on said eccentric portion and having a pair of diametrically opposed slots extending axially inwardly of said member from the opposite axial end of said member, the opposed walls of said slots being engageable within the recesses of the respective piston to positively drive said pistons in both radially inward and outward movement.

6. The invention defined in claim 5 wherein the opposed walls of said slots are spaced from each other circumferentially to accommodate motion of said member in a direction normal to the path of movement of said pistons.

* * * * *